March 10, 1942.　　　　F. C. OWEN　　　　2,276,060
WELDING APPARATUS
Filed Dec. 14, 1939
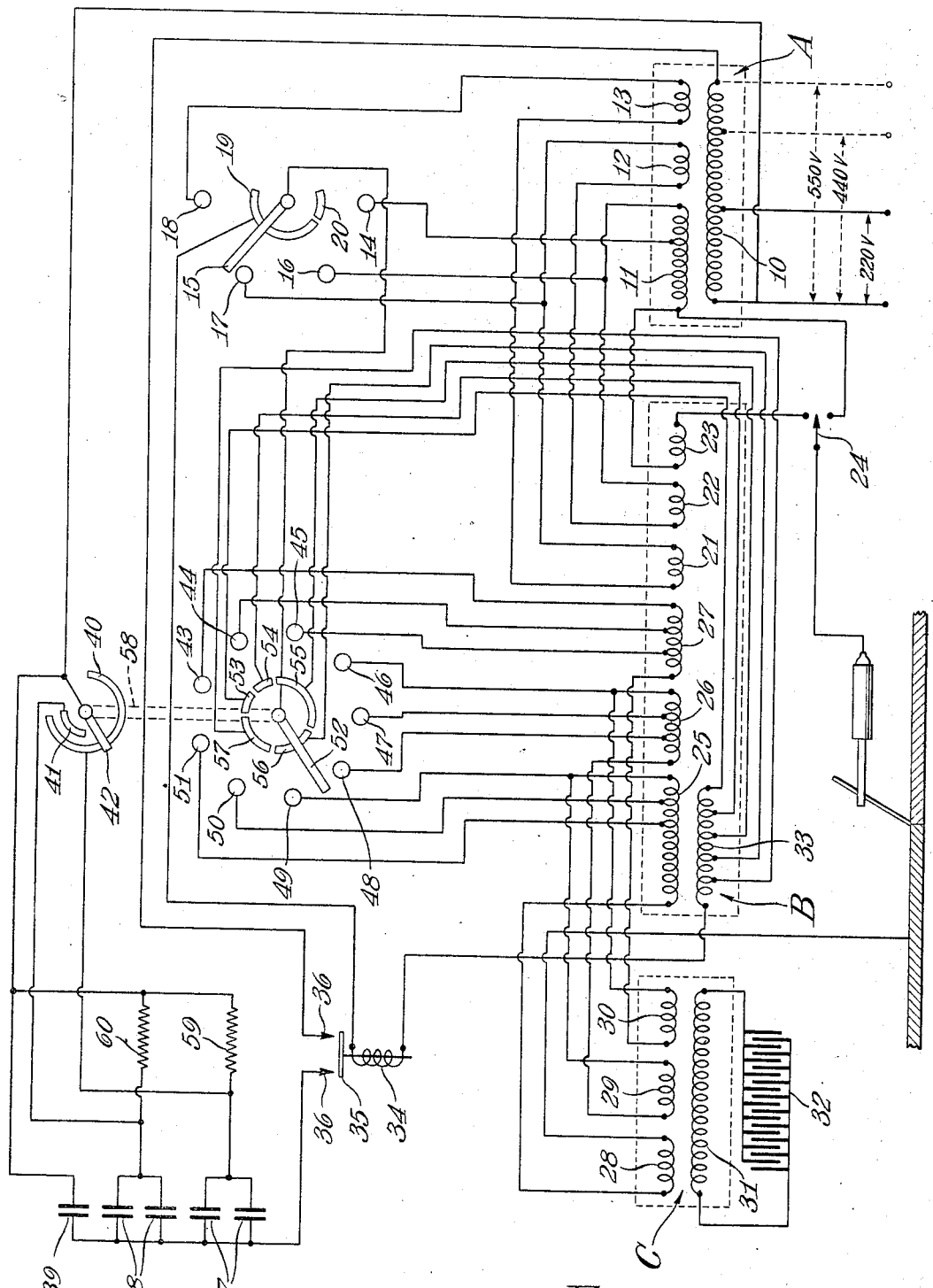
Frederick C. Owen.
INVENTOR
BY
ATTORNEY Patented Mar. 10, 1942

2,276,060

UNITED STATES PATENT OFFICE 2,276,060

WELDING APPARATUS

Frederick C. Owen, Fayetteville, N. C.

Application December 14, 1939, Serial No. 309,261

8 Claims. (Cl. 219—8)

The object of the invention is to provide welding apparatus embodying improvements in design over the constructions shown in application No. 9,367, filed May 12, 1936 and application No. 250,832, filed January 13, 1939 by the applicant herein; to provide welding apparatus in which the capacity for power factor correction is independent of that used for the production of oscillating currents but is nevertheless actively included in circuit only when the secondary is under load, as when welding; and generally to provide improvements in welding apparatus which will make it possible for the operator by quick adjustment, to secure to a nicety the arc best suited to the particular work in hand.

With this object in view, the invention consists in a construction and combination of parts of which the preferred embodiment is illustrated in the accompanying drawing, wherein:

The figure is a diagrammatic view of the invention.

The welding apparatus disclosed herein consists of three main units, the power transformer A, the reactor B and the oscillating transformer C of which the windings are wound on H-shaped cores of the form disclosed in application No. 250,832 of the series of 1935, the center leg of the reactor core being formed with an air gap which may be either fixed, or adjustable, as circumstances demand.

The power transformer A consists of a primary 10 wound, preferably, for a 550 volt energizing circuit, although it is provided with a 440 volt tap as well as a 220 volt tap, so that it is applicable for use on a circuit of any one of these voltages. The secondary of the power transformer is wound in sections so that it consists of a group composed of the group members 11, 12 and 13, the group member 11 being tapped intermediate its ends with the tap connected to a contact 14 of an adjustable control switch composed of a pivotally mounted arm 15 and the additional contacts 16, 17 and 18 as well as the segments 19 and 20.

One end of the group member 11 is connected to the contact 16, the corresponding end of the group member 12 to the contact 17 and the corresponding end of the group member 13 to the contact 18.

The reactor B is made up of a duality of groups of windings of which one consists of the group members 21, 22 and 23 and these group members are in intervening relation, electrically, with the group members 11, 12 and 13, the group member 23 being serially connected with the group member 11, the group member 22 similarly with the group member 12 and the group member 21 similarly with the group member 13, so that current flowing in the secondary of the power transformer, if it is assumed to originate in the group member 11, will flow from the latter through the group member 22, then through the group member 12, then through the group member 21 and then through the group member 13. But on returning to the group member 11 it will flow through the group member 23 if the switch 24 be so positioned as to accomplish this, the switch 24 being a single-pole double-throw switch of which one contact is connected to the terminal of the group member 23 and the other to the terminal of the group member 11. If the switch be in the position to engage the latter contact, the group member 23 will be cut out of circuit.

The other group of the reactor consists of the group members 25, 26 and 27 and these group members are arranged in electrical intervening relation with the group members 28, 29 and 30 of the secondary of the oscillating transformer, it being assumed herein that this group of windings is a secondary despite the fact that the oscillating transformer is primarily energized upon the flow of arc current. This, because in this apparatus the oscillating current which is so effective in producing the desired results is derived from the capacity in circuit.

The primary 31 of the oscillating transformer is connected across a capacity 32 consisting preferably of a bank of condensers totaling about one hundred microfarads. The group members of the oscillating transformer secondary and the associated group members of the reactor, are serially connected. The current originating in the group member 11 will, in passing through the secondary of the oscillating transformer and its associated section of the reactor, assuming all of the group members to be in circuit, pass first through the group member 27, then the group member 30, then the group member 26, then the group member 29, then the group member 25, then the group member 28 and then to the work, one extremity of the group member 28 being the ground or work terminal.

The reactor B, in addition to its reactive inductance windings, carries a switch energizing secondary 33 of which one terminal is connected to the winding of a solenoid 34 which, when energized, moves a contactor 35 into bridging relation with the contacts 36 and 36', of which the former is connected to one side of a capacity composed of the condensers 37, 38 and 39 and the latter connected to the high potential end of the power transformer primary.

The condensers 37, 38 and 39 are each of about twenty-two microfarads capacity and are thrown into and out of circuit, except the condenser 39, by the operation of a control switch composed of the segments 40 and 41 and the contact arm 42 which moves over these. This control switch is synchronized with and operated by a control switch through which the group members 25, 26 and 27 are brought into and cut out of circuit, these group members having one extremity and intermediate taps connected to contacts of the control switch. One terminal of the group member 27 is connected to the contact 43 and its intermediate taps to the contacts 44 and 45. The corresponding terminal of the group member 26 is connected to the contact 46 and its intermediate taps to the contacts 47 and 48. The corresponding terminal of the group member 25 is connected to the contact 49 and its intermediate taps to the contacts 50 and 51. This control switch, which comprises the contact arm 52 which moves over and engages the contacts 43 to 51, is provided with a series of segments which are likewise engaged by the arm 52 and these segments are connected, segment 53 with the extremity of the secondary 33 opposite that which is connected to the solenoid 34 and the remaining segments successively connected to intermediate taps on said secondary.

When the contact arm 52 is engaged with the contact 43, it is also in contact with the segment 53. Similarly when in engagement with the contact 44, the arm also engages the segment 54, the segments 53 and 54 being of slight angular extent. The segment 55, however, has the same angular extent as the contacts 45, 46 and 47, so that the contact arm 52 engages this when engaged with any one of these three contacts. The segment 56 is of such an angular extent that engagement with it is effected when the contact arm is in engagement with either the contacts 48 or 49 and similarly the contact 57 is engaged when the contact arm is in engagement with either the contacts 50 or 51.

Since the capacity control switch is synchronized with the inductor control switch, its arm 42 moves simultaneously with any adjustment of the arm 52. But the segment 40 is of such an angular extent that the contact arm 42 engages it when the contact arm 52 is in engagement with any of the contacts from 45 to 51 inclusive. The segment 41 is of such angular extent that engagement of the arm 42 with it takes place only when the contact arm 52 is in engagement with the contacts 50 or 51. The contact arms 52 and 42 are synchronously operated by reason of being coupled together with a rod 58 which is of insulating material such as fibre.

One terminal of each of the condensers 37, 38 and 39 is connected with the contact 36 of the switch member 35. The other terminals are connected those of the condensers 37 with the segment 40 and those of the condensers 38 with the segment 41 and that of the condenser 39 with the arm 42, this arm being connected with the energizing circuit at the side opposite that to which the contact 36' of the switch 35 is connected.

Resistors 59 and 60 are connected between the condensers 37 and 38 respectively and one side of the power line, these resistors being of approximately 30,000 ohms for discharging the condensers so that there will be no arcing at the condenser control switch composed of the arm 42 and its associated segments.

The condensers 37, 38 and 39, it will be noted, are connected across the extremities of the primary 10 of the power transformer A, so that if the apparatus be operated from the 550 volt circuit, the condensers will be excited directly therefrom. If operation be from a 220 volt or 440 volt circuit, the condensers will still be excited by the desired 550 volt potential due to the auto-transformer function that the primary will, under such conditions, perform.

The switch actuating secondary 33 is tapped for the purpose of maintaining the proper step-down ratio for switch actuation in any position of the inductor control switch. Where all of the inductance controlled by the switch is in circuit, the entire secondary is active and decrements are cut out of circuit as group members of inductance or portions thereof are similarly cut out. Thus the switch 35, whatever the setting of the control switch, is operated substantially at uniform potential.

In operation, let it be assumed that the control switch of the inductor has its arm 52 engaged with the contact 43. This will mean that the contact arm 42 has been shifted from engagement with either of the segments 41 or 40 with the result that the condensers 37 and 38 will be cut out of circuit. If, in this position, the contact arm 15 is engaged with the contact 18, then current originating in the secondary of the power transformer will traverse the following path: From the group member 13 to the contact 18, to the arm 15, to the contact arm 52 which is electrically connected with the contact arm 15, to the contact 43, through the group member 27, the group member 30, the group member 26, the group member 29, the group member 25, the group member 28 to the work, through the electrode to the switch 24 and, depending on the position of the switch, either through to the group member 11 or through the group member 23 to the latter, then through the group member 22, the group member 12, the group member 21, back to the group member 13.

The switch 24 will be set to include the group member 23 or to exclude the latter from the circuit, depending on whether the welding is to be done with bare and light coated electrode or with shielded arc type electrode, the group member 23 being cut out in the use of the latter.

In such an arrangement of the parts, there will be less need for the power factor correcting capacity than in other positions and therefore only the condenser or capacity 39 remains connected across the line. If the switch arm 52 be moved to engage the contact 44, the same condition will obtain with the exception that a portion of the inductance of the group member 27 will be cut out of circuit. But with the full secondary of the oscillating transformer being in circuit, as it will be under these conditions, the capacity 32 will have power factor correcting effects on the line.

If the arm 52 be moved to the position where it engages, say, the contact 46, the arm 42 will be in engagement with the segment 40 and the capacity 37 will be placed in circuit. But at this time the group member 30 is cut out of circuit so that the capacity 32 does not have its hitherto effect for line power factor correction. As the arm 52 is advanced to engage the contacts 50 and 51, the secondary of the oscillating transformer will be further reduced but to compensate for this loss in power factor correction, the condensers 38 will be placed in circuit by the arm 42 engaging the segment 41.

The control switch for the secondary of the power transformer will, in its various positions, vary the group members of the secondary and its associated inductor windings in circuit and by contact with the segment 19 will maintain the condenser 39 in circuit when the switch 35 is closed. This is not the case, however, when the arm 15 engages the contact 14, for then it has left the segment 19 and is in engagement with the dead segment 20. But this position of the arm is only for the open circuit voltage control of the power transformer secondary.

By reason of the secondary of the oscillating transformer and power transformer being in series and including the inductor, the capacity control automatic switch 35 can function only when the electrode is engaged with the work as shown in the drawing.

What is claimed as new and useful is:

1. Welding apparatus comprising a power transformer, an oscillating transformer, a reactor comprising a group of windings, the secondaries of the transformers being wound in groups, the reactor and the transformer secondaries being serially connected to constitute a welding circuit in which the work and electrode are serially included, the group members of the secondaries intervening electrically between the group members of the reactor, and means for selectively varying the group members actively in circuit.

2. Welding apparatus comprising a power transformer, an oscillating transformer, a reactor comprising a duality of groups of windings, the secondaries of the transformers being wound in groups, the reactor and the transformer secondaries being serially connected to constitute a welding circuit in which the work and the electrode are serially included, the members of one group of the reactor windings intervening electrically between the group members of the oscillating transformer secondary and the members of the other group intervening electrically between the group members of the secondary of the power transformer, and means for selectively varying the group members actively in circuit.

3. Welding apparatus comprising a power transformer, an oscillating transformer, a reactor comprising a duality of groups of windings, the secondaries of the transformers being wound in groups, the reactor and the transformer secondaries being serially connected to constitute a welding circuit in which the work and the electrode are serially included, the members of one group of the reactor windings intervening electrically between the group members of the oscillating transformer secondary and the members of the other group intervening electrically between the group members of the secondary of the power transformer, and means for selectively varying the group members actively in circuit, the last said means comprising a duality of manual controls of which one controls the power transformer secondary and its directly associated reactor windings and the other controls the secondary of the oscillating transformer and its directly associated group of reactor windings.

4. Welding apparatus comprising a power transformer, an oscillating transformer, a reactor, the reactor and the secondaries of the transformers being serially connected to constitute a welding circuit in which the work and the welding electrode are serially included, means for selectively adding increments of inductance to and subtracting decrements of inductance from the reactor and secondary of the oscillating transformer, a power factor correcting capacity across the primary of the power transformer, and means coordinated with the last said means and controlling the amount of power factor correcting capacity maintained in circuit.

5. Welding apparatus comprising a power transformer, an oscillating transformer, a reactor, the reactor and the secondaries of the transformers being serially connected to constitute a welding circuit in which the work and the welding electrode are serially included, means for selectively adding increments of inductance to and subtracting decrements of inductance from the reactor and secondary of the oscillating transformer, a power factor correcting capacity across the primary of the power transformer, and automatic means for including said capacity in circuit only when the welding circuit is under load.

6. Welding apparatus comprising a power transformer, an oscillating transformer, a reactor, the reactor and the secondaries of the transformers being serially connected to constitute a welding circuit in which the work and the welding electrode are serially included, means for selectively adding increments of inductance to and subtracting decrements of inductance from the reactor and secondary of the oscillating transformer, a power factor correcting capacity across the primary of the power transformer, means coordinated with the last said means and controlling the amount of capacity maintained in circuit, and automatic means for including said capacity in circuit only when the welding circuit is under load.

7. Welding apparatus comprising a power transformer, an oscillating transformer, a reactor, the reactor and the secondaries of the transformers being serially connected to constitute a welding circuit in which the work and the welding electrode are serially included, means for selectively adding increments of inductance to and subtracting decrements of inductance from the reactor and secondary of the oscillating transformer, a power factor correcting capacity across the primary of the power transformer, and automatic means for including said capacity in circuit only when the welding circuit is under load, said automatic means comprising a magnetic circuit closer and energizing means therefor consisting of a reactor influenced secondary.

8. Welding apparatus comprising a power transformer, an oscillating transformer, a reactor, the reactor and the secondaries of the transformers being serially connected to constitute a welding circuit in which the work and the welding electrode are serially included, means for selectively adding increments of inductance to and subtracting decrements of inductance from the reactor and secondary of the oscillating transformer, a power factor correcting capacity across the primary of the power transformer, and automatic means for including said capacity in circuit only when the welding circuit is under load, said automatic means comprising a magnetic circuit closer and energizing means therefor consisting of a reactor influenced secondary, said secondary comprising a variable inductance, and means coordinated with the first said means for varying said inductance.

FREDERICK C. OWEN.